(12) United States Patent
Zou et al.

(10) Patent No.: US 11,927,216 B2
(45) Date of Patent: Mar. 12, 2024

(54) THREE-SECTION SYNCHRONOUS SLIDE RAIL

(71) Applicant: WUXI HAIDAER PRECISION SLIDES CO., LTD, Jiangsu (CN)

(72) Inventors: Lian Zou, Jiangsu (CN); Xinglong Xu, Jiangsu (CN); Feng Qian, Jiangsu (CN); Kai Dai, Jiangsu (CN); Dong Zhu, Jiangsu (CN); Qiang Ji, Jiangsu (CN)

(73) Assignee: WUXI HAIDAER PRECISION SLIDES CO., LTD, Jiangsu (CN)

( * ) Notice: Subject to any disclaimer, the term of this patent is extended or adjusted under 35 U.S.C. 154(b) by 469 days.

(21) Appl. No.: 17/270,859

(22) PCT Filed: Aug. 19, 2019

(86) PCT No.: PCT/CN2019/101341
§ 371 (c)(1),
(2) Date: Feb. 23, 2021

(87) PCT Pub. No.: WO2020/038324
PCT Pub. Date: Feb. 27, 2020

(65) Prior Publication Data
US 2021/0199155 A1  Jul. 1, 2021

(30) Foreign Application Priority Data
Aug. 24, 2018  (CN) .......................... 201810971292.1

(51) Int. Cl.
*F16C 29/04* (2006.01)
*A47B 88/437* (2017.01)
*A47B 88/493* (2017.01)
*F16C 29/00* (2006.01)

(52) U.S. Cl.
CPC ............ *F16C 29/04* (2013.01); *A47B 88/493* (2017.01); *A47B 88/437* (2017.01); *A47B 2210/0037* (2013.01); *A47B 2210/007* (2013.01); *F16C 29/005* (2013.01)

(58) Field of Classification Search
CPC ...... F16C 29/04; F16C 29/005; A47B 88/493; A47B 88/437; A47B 2210/0037; A47B 2210/007
See application file for complete search history.

(56) References Cited

U.S. PATENT DOCUMENTS

| | | | |
|---|---|---|---|
| 9,675,174 B2 * | 6/2017 | Jahrling | A47B 88/45 |
| 2017/0086584 A1 * | 3/2017 | Rehage | A47B 88/473 |
| 2022/0142363 A1 * | 5/2022 | Lee | A47B 88/443 |

* cited by examiner

Primary Examiner — Anita M King

(57) ABSTRACT

A three-section synchronous slide rail, which has simple structure, longer service life, is easy to install and replace is provided, which includes: two sets of slide rail assemblies which comprise a fixed rail, a middle rail and a sliding rail, synchronization components comprising a flexible deflector unit and a roller, the flexible deflector unit is connected with the fixed rail and the sliding rail, the middle rail is connected with a rope base, a first end of the flexible deflector unit is wound around a first end of the rope base and fixed to the rope base, and a second end of the flexible deflector unit bypasses the roller and is reversely wound on a second end of the rope base and the second end of the flexible deflector unit is fixed to the rope base, a connecting rod is connected between the rope bases.

4 Claims, 7 Drawing Sheets

THREE-SECTION SYNCHRONOUS SLIDE RAIL

BACKGROUND OF THE PRESENT INVENTION

Field of Invention

The invention relates to the technical field of slide rails, and more particular to a three-section synchronous slide rail.

Description of Related Arts

The conventional synchronous slide rail intelligently ensures that the slide rail is synchronized when the slide rail is in use, and cannot simultaneously ensure the synchronization of the middle rail during the movement.

At present, slide rail devices that can synchronize the synchronous movement of the intermediate slide rail have been disclosed in the field, such as a patent application with a publication number of CN105407760A, which discloses a pull-out system that can realize the synchronous movement of the middle slide rail and the movable rail; wherein at least one flexible deflection element 11 is fixed to the holder 12 and the holder 14 at the connection point 13 and the connection point 15; and the flexible deflection element 11 surrounds the deflection roller 16 provided on the middle rail 3 in the front area, wherein the deflection is approximately 180°; and the flexible deflection element 11 between the running track 2, the intermediate track 3 and the stationary track 4 can be used for sequential control to ensure that the running track 2 moves two times as fast as the intermediate track 3 and prevents slides between the tracks. Meanwhile the two pull-out guides 1 are connected to each other in the rear area after passing the flexible deflection element 11, so that the flexible deflection element 11 and the two middle rails 3 move together in the rear area, i.e., moving the running rails 2 synchronously on the two sides are realized. However, the structure is complicated, and the length of the flexible deflection element needs to be strictly matched with the length of the slide rail and the distance between the slide rails. In actual use, the two slide rails are connected by the flexible deflection element and deflected by the flexible synchronization of the components will aggravate the wear of the flexible deflection element. It is difficult to replace the flexible deflection element, and after the installation is completed, there will be a deviation between the actual size and the theoretical size of the two slide rails. At this time, the flexible deflection element needs to be adjusted to keep it straining is more difficult.

SUMMARY OF THE PRESENT INVENTION

Technical Problem

In view of the complex structure of the conventional synchronous slide rail and the easy wear of the flexible deflection element, the present invention provides a three-section synchronous slide rail, which has a simple structure, is easy to install and replace, and has a longer service life.

Solutions to the Problem

Technical Solutions

The technical solution is as follows. A three-section synchronous slide rail, comprises: two sets of slide rail assemblies, wherein the two sets of the slide rail assemblies are respectively installed with synchronization components, the slide rail assemblies respectively comprise a fixed rail, a middle rail and a sliding rail, the synchronization components respectively comprise a flexible deflector unit and a roller provided on the middle rail, the flexible deflector unit is respectively connected with the fixed rail and the sliding rail, wherein the middle rail is further connected with a rope base, the rope base is capable of rotating on the middle rail, a first end of the flexible deflector unit is wound around a first end of the rope base and then fixed to the rope base, and a second end of the flexible deflector unit bypasses the roller, then is reversely wound on a second end of the rope base and fixed to the rope base, and a connecting rod is connected between the rope bases of the two sets of the slide rail assemblies.

Further characteristics of the present invention are as follows. A first connector is fixedly connected with the sliding rail, a second connector is fixedly connected with the fixed rail, and the first connector and the second connector are respectively configured to connect the flexible deflector unit. A spiral groove is provided on the rope base, and the flexible deflector unit is wound on the rope base along a rotation path of the spiral groove. The flexible deflector unit comprises a first flexible deflector, a second flexible deflector, and a third flexible deflector;

wherein a first end of the first flexible deflector is fixed and wound on the rope base, and a second end of the first flexible deflector is connected to a first end of the third flexible deflector via the first connector, and a second end of the third flexible deflector is connected to a first end of the second flexible deflector through the second connector after bypassing the roller; a second end of the second flexible deflector is wound and connected on the rope base.

Fixed grooves are provided on the openings of both ends of the spiral groove, fixed grooves are respectively provided on a middle portion of the first connector and the second connector, and the fixed grooves of the first connector and the second connector extend on both sides to form slots matching with a size of the flexible deflector unit; a first end of the first flexible deflector is installed in a first fixing groove on the rope base through a fixing block; a second end of the first flexible deflector and a first end of the third flexible deflector are installed in the fixing groove on the first connector through a fixing block; and a second end of the third flexible deflector and a first end of the second flexible deflector are installed in the fixing groove of the second connector through fixing block, and a second end of the second flexible deflector is installed in a second fixing groove of the rope base through the fixing block. The rope base is sheathed with a socket, the socket wraps the rope base, an opening for the flexible deflector is provided on the socket; a first hook-shaped connector is provided on a side where the socket contacts the middle rail; the first hook-shaped connector is clamped with a hole on the middle rail; a connecting protrusion is provided on a side where socket contacts the rope base; wherein protrusions are provided on the connecting protrusion, which are used for clamping with the second hook-shape connector in the groove on a side of the rope base. A front end of the first hook-shaped connector is provided with a thin front and a thick inclined surface, a rear end of the inclined surface is provided with a first clamping groove, and a through groove is opened in the middle of the first hook-shaped connector; front thick and rear thin inclined surfaces are provided on the protrusion, the front end of the protrusion is provided with a second clamping groove, and the front end of the second hook-shaped connector is provided with an inclined surface for matching the protrusion.

The Beneficial Effects of the Invention

Beneficial Effect

After adopting such a structure, the rope bases on both sides are rotated synchronously through the connecting rods fixedly connected to the rope base, and then the sliding rail and the middle rail are kept in synchronous movements through the function of the flexible deflector; The flexible deflector, the rope base and the connecting rod is capable of realizing the synchronous movement of the two sets of slide rails. The structure of the present invention is simple, and the installation and production are convenient; and because the flexible deflection member is wound and connected to the rope base, and then the two sets of slide rails are connected by the connecting rod, the rail assembly can be replaced separately during replacement, which is more convenient. Meanwhile, the connecting rod is used as the component connecting the two sets of slide rail assemblies, which is less prone to wear and has a longer service life.

DETAILED DESCRIPTION OF THE PREFERRED EMBODIMENT

Figure 1:
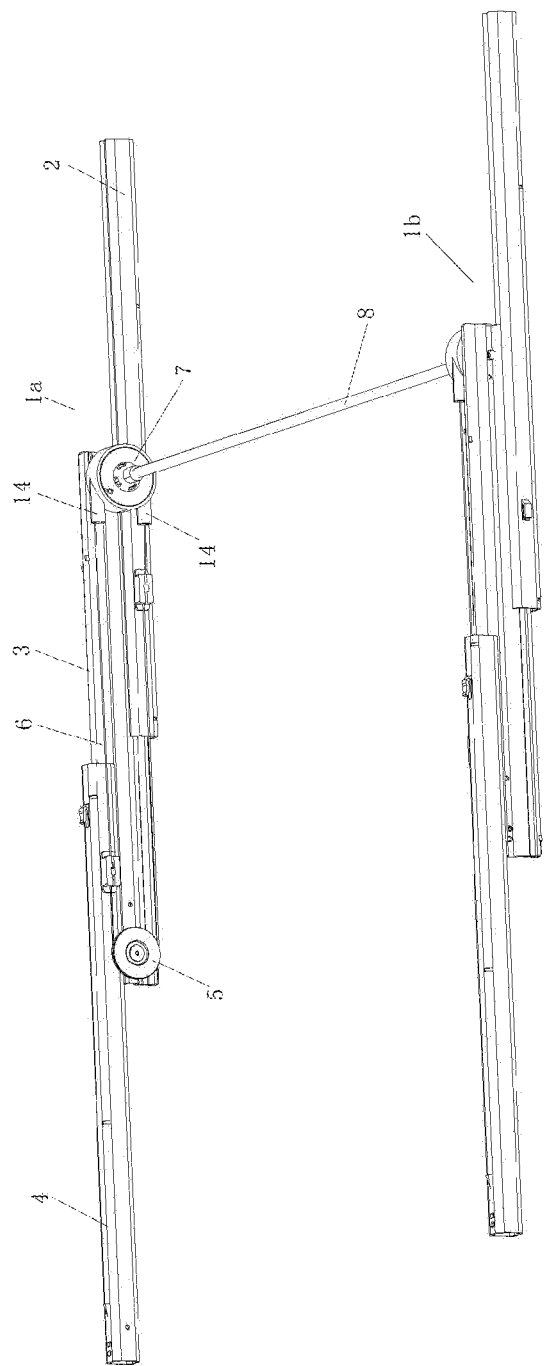
FIG. 1 is a structural diagram of a three-section synchronous slide rail according to a preferred embodiment of the present invention in a fully expanded state.
Figure 2:
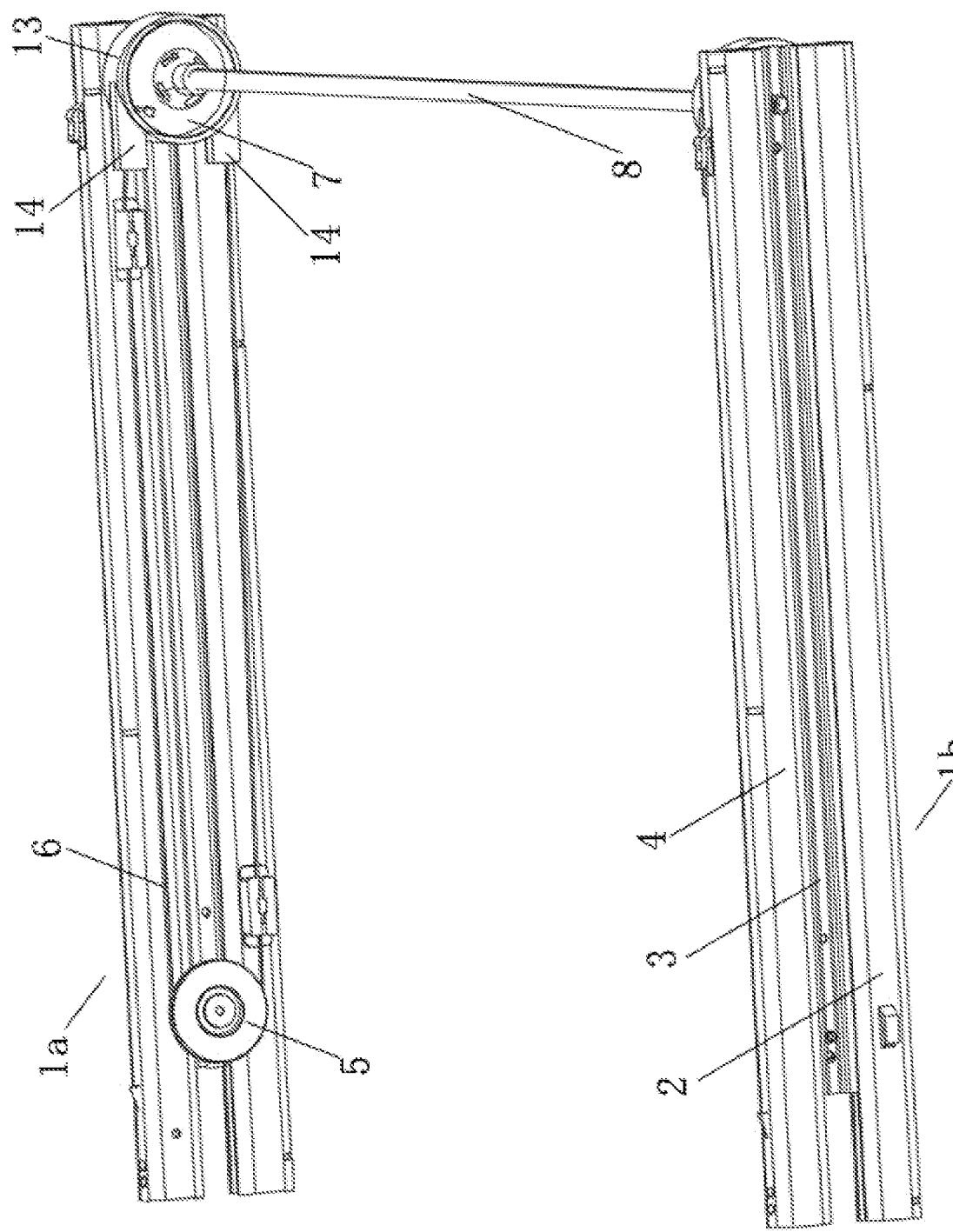
FIG. 2 is a structural diagram of the present invention in a fully closed state.

The three-section synchronous slide rail shown in FIG. 1 and FIG. 2, a three-section synchronous slide rail, comprising: two sets of slide rail assemblies 1a and 1b, wherein the two sets of the slide rail assemblies 1a and 1b are respectively installed with synchronization components, the slide rail assemblies 1a and 1b respectively comprise a fixed rail 2, a middle rail 3 and a sliding rail 4, the synchronization components respectively comprise a flexible deflector unit 6 and a roller 5 provided on the middle rail, wherein the flexible deflector unit 6 is respectively connected with the fixed rail 2 and the sliding rail 4, wherein the middle rail 3 is further connected with a rope base 7, the rope base 7 is capable of rotating on the middle rail 3, a first end of the flexible deflector unit 6 is wound around a first end of the rope base 7 and then fixed to the rope base 7, and a second end of the flexible deflector unit 6 bypasses the roller 5, then is reversely wound on a second end of the rope base 7 and fixed to the rope base 7, and a connecting rod 8 is connected between the rope bases 7 of the two sets of the slide rail assemblies 1a and 1b.

Figure 3:
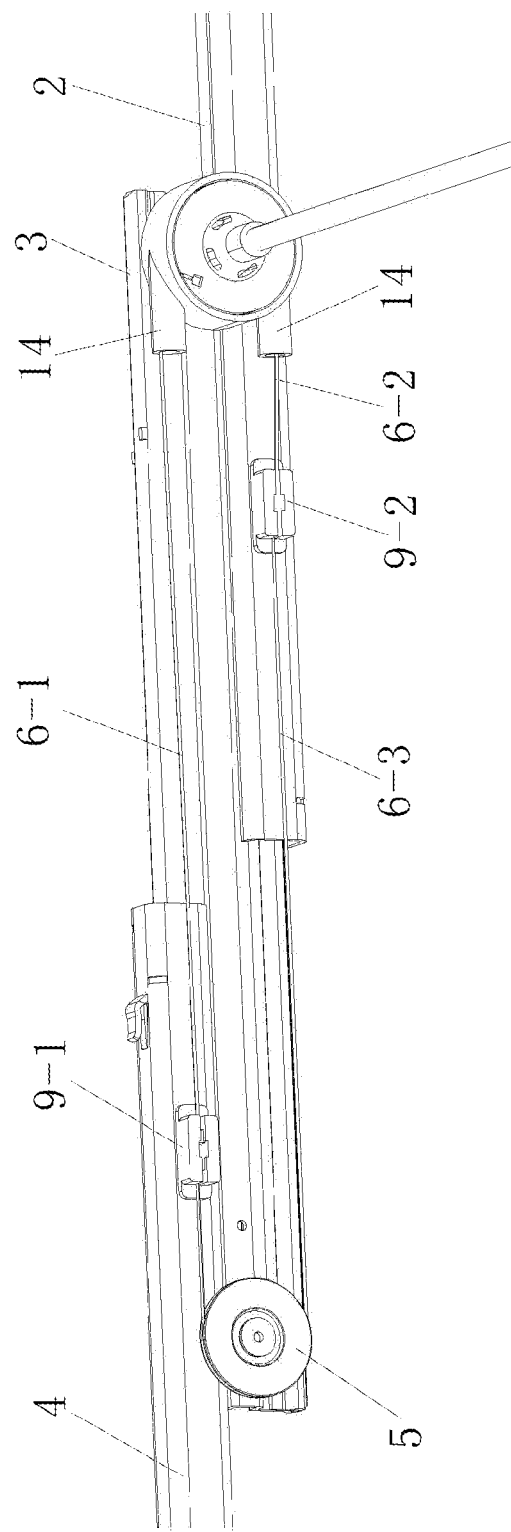
FIG. 3 is a partially enlarged structural view of a single-sided slide rail assembly in an expanded state.
Figure 4:
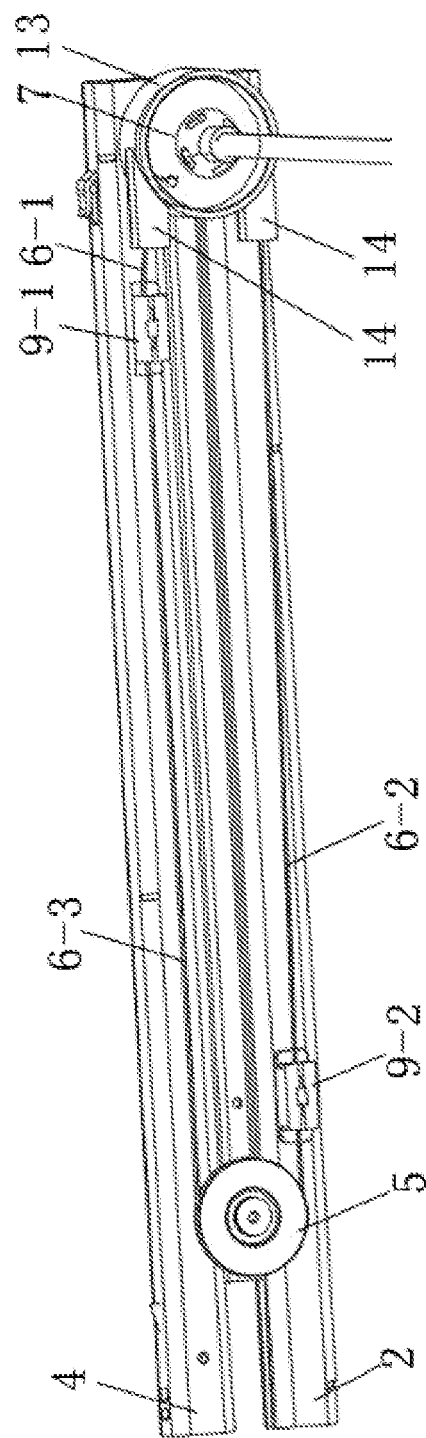
FIG. 4 is a single-sided slide rail assembly enlarged structural diagram in the closed state.
Figure 8:
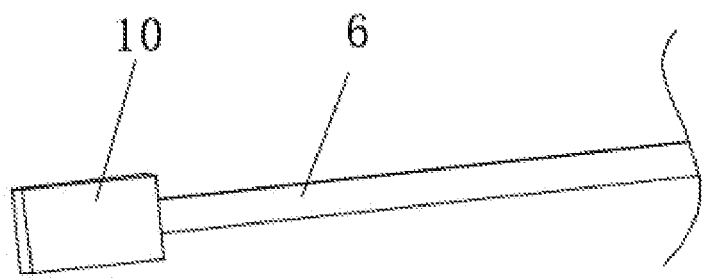
FIG. 8 is a diagram of the connection relationship between the protrusion and the flexible deflector.
Figure 9:
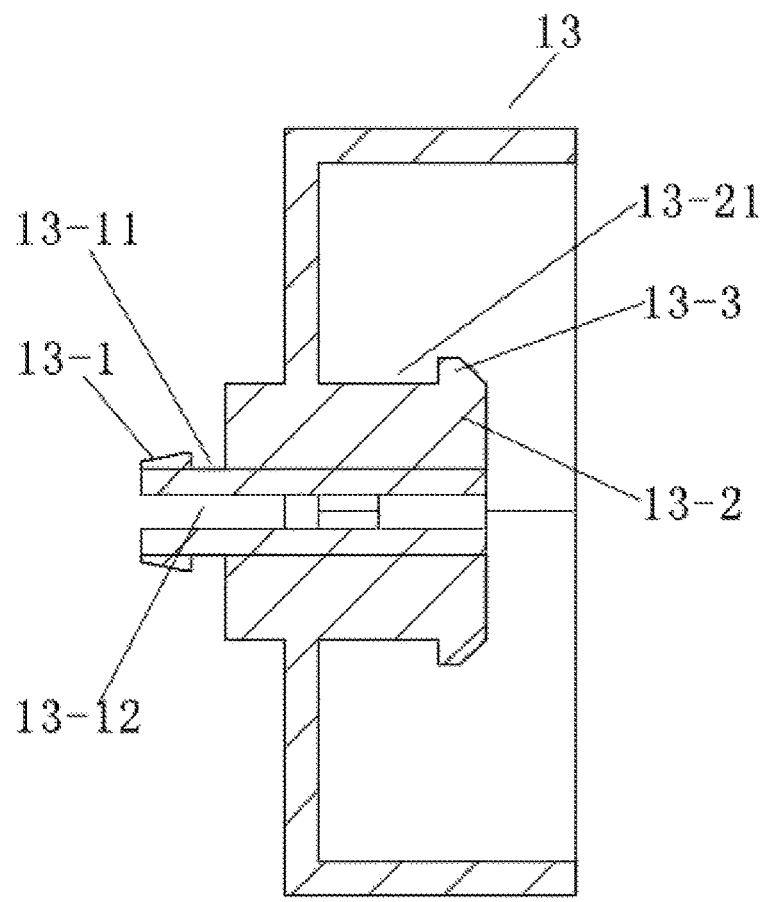
FIG. 9 is a cross-sectional view of the socket.

As shown in FIG. 3, FIG. 4, and FIG. 8, a first connector 9-1 is fixedly connected to the sliding rail 4, a second connector 9-2 is fixedly connected to the fixed rail 2, and the first connector 9-1 and the second connector 9-2 are respectively configured to connect the first flexible deflection member 6-1 and the second flexible deflection member 6-2 which are connected with the rope base 7, and the third flexible deflection member 6-3 is in contact with the roller 5 and further connected with the first connector 9-1 and the second connector 9-2. Specifically, a first end of the first flexible deflecting piece 6-1 is fixed and wound on the rope base 7, and a second end of the first flexible deflection piece 6-1 is connected to one end of the third flexible deflection member 6-3 via the first connector 9-1, and a second end of the third flexible deflection member 6-3 passes by the roller 5 to connect the second flexible deflection member 6-2 via the second connection member 9-2. A second end of the second flexible deflection member 6-2 is wound and fixedly connected to the rope base 7. All ends of the first flexible deflection member 6-1, the second flexible deflection member 6-2, and the third flexible deflection member 6-3 are connected with fixing blocks 10, Of course, there may be one, two or even more than three flexible deflection members 6, and they may not be connected by connecting members, as long as the flexible deflection member 6 can be fixed to the sliding rail 4 and the fixed rail 2 in other ways.

Figure 5:
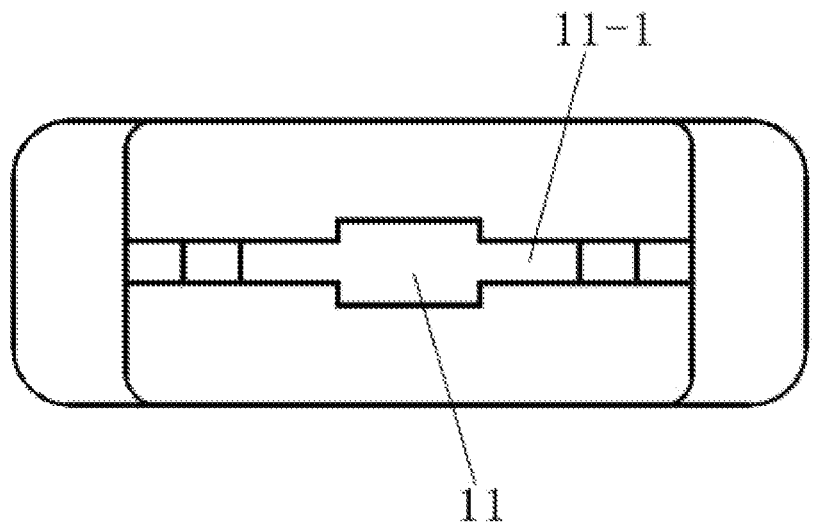
FIG. 5 is a structural diagram of the connector.
Figure 6:
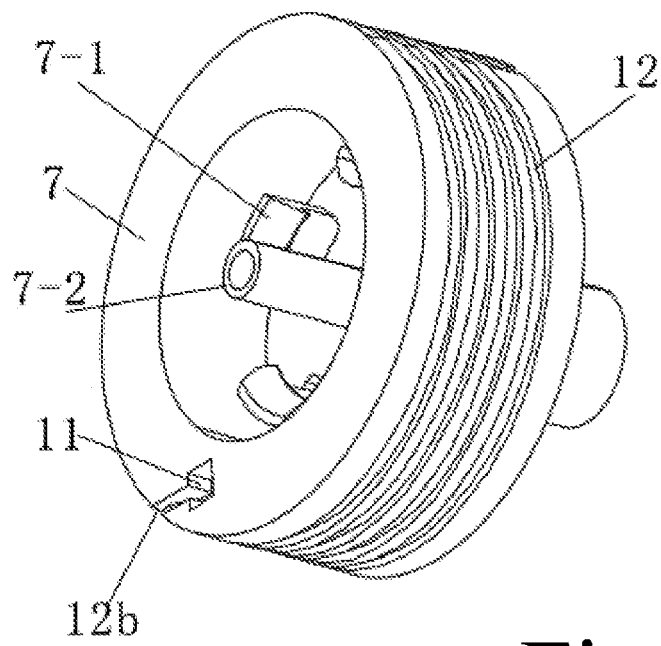
FIG. 6 is a structural diagram of a first side of the rope base.
Figure 7:
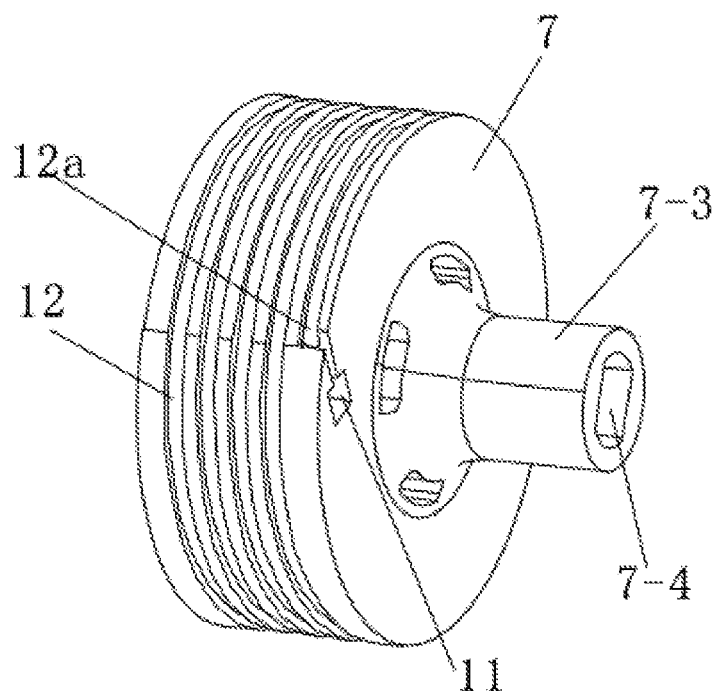
FIG. 7 is a structural diagram of a second side of the rope base.

Further, as shown in FIGS. 5, 6, and 7, the rope base 7 is cylindrical and the rope base 7 is provided with a spiral groove 12, and the flexible deflection member 6 is wound around the rope base 7 according to the rotation path of the spiral groove 12; wherein a length of the flexible deflection member 6 wounded on the rope base 7 is greater than or equal to a length of the flexible deflection member 6 pulled out of the rope base 7, that is, when the flexible deflection member 6 is fully pulled out, its pulled-out section can no longer be wound around the rope base 7 and only connected to the rope base 7, and there may also be a part of the flexible deflection member 6 wounded on the rope base 7. Specifically, the outlets 12a and 12b at the two ends of the spiral groove 12 are provided with fixed grooves 11, fixing grooves 11 are respectively provided on both middle portions of first connector 9-1 and the second connector 9-2; and two sides of the fixing grooves 11 of the first connector 9-1 and the second connector 9-2 extend to form grooves 11-1 matching with the size of the flexible deflection piece 6. A first end of the first flexible deflector 6-1 is installed in a first fixing groove 12a on the rope base 7 through a fixing block 10; a second end of the first flexible deflector 6-1 and a first end of the third flexible deflector 6-3 are installed in the fixing groove 11 on the first connector 9-1 through a fixing block; and a second end of the third flexible deflector 6-3 and a first end of the second flexible deflector 6-2 are installed in the fixing groove 11 of the second connector 9-2 through fixing block and a second end of the second flexible deflector 6-2 is installed in a second fixing groove 12b of the rope base 7 through the fixing block 10.

Figure 10:
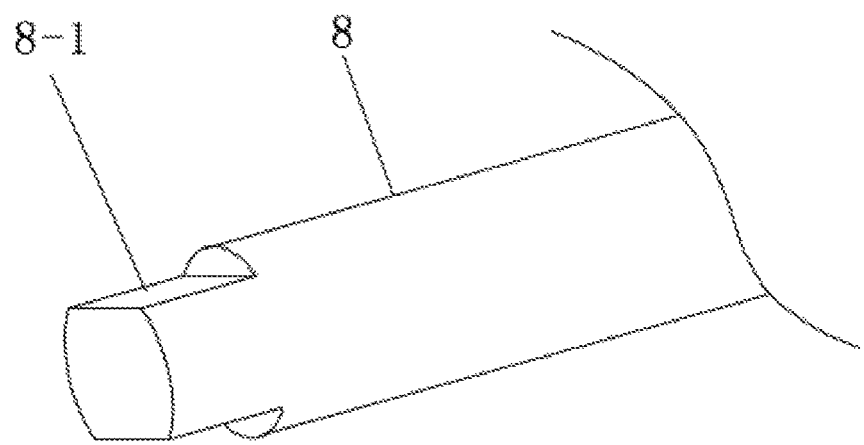
FIG. 10 is a structural view of the end of the connecting rod.

The flexible deflector is specifically a rope. The protrusion 10 is inserted into the fixing groove 11 by pulling the flexible deflection member 6. At this time, the flexible deflection member 6 shrinks, and the flexible deflection member 6 is always in a tensioned state by the pulling force of the rope. Not only is the flexible deflection element 6 easy to install, but the flexible deflection element 6 can be tensioned through a simple structure, and that in the actual installation process, a deviation of an actual distance and a theoretical distance between the two slide rail assemblies 1a, 1b won't affect the tightness of the flexible deflector 6 and does not need to be adjusted. In addition, the connecting rod 8 is clamped with the rope base 7. Specifically, as shown in FIGS. 7 and 10, the connection 7-3 on the rope base 7 protrudes and has connecting hole 7-4. The connecting hole 7-4 is flat and matches with the shape of the connecting end 8-1 of the connecting rod 8. The connecting end 8-1 of the connecting rod 8 extends into the connecting hole 7-4, so as to be clamped with the rope base 7, so that the actual distance between the two slide rail assemblies 1a, 1b can be adjusted to adjust the distance between the connecting end 8-1 of the connecting rod 8 inserting in a connection portion 7-3 of the rope base 7 to make axial adjustment. At the same time, rope base 7 drives the connecting rod 8 to rotate in a circumferential direction can be ensured as well.

As shown in FIG. 2, FIG. 4, FIG. 6 and FIG. 9, the rope base 7 is covered with a socket 13, the socket 13 wraps the rope base 7, and the socket 13 is provided with a flexible deflector inlet 14 to prevent the wear of foreign objects, it can play the role of guiding and protecting the rope base 7 and the flexible deflection member 6. Specifically, the contact side of the socket 13 and the intermediate rail 3 is provided with a first hook-shaped connecting member 13-1. The connector 13-1 is clamped with the hole on the middle rail 3; the contact side of the socket 13 and the rope base 7 is provided with a connecting protrusion 13-2, and the connecting protrusion 13-2 is provided with a protrusion 13-3 which is configured to clamp with the second hook-shaped connector 7-1 in the groove on the side of the rope base 7.

Further, the front end of the first hook-shaped connector 13-1 is provided with an inclined surface with a thin front and a thick rear surface, and the rear end of the inclined surface is provided with a first clamping groove 13-11, and through slots 13-12 are provided on a middle portion of the first hook-shaped connector 13-1, so that the first hook-shaped connector 13-1 can be easily inserted into the hole on the middle rail 3, and when it needs to be disassembled, press the upper and lower ends of the first hook-shaped connector 13-1, it can be separated from the middle rail 3, which is easy to install and disassemble; the protrusion 13-3 is provided with a front thick and a rear thin slope, and the front end of the protrusion 13-3 is provided with a second clamping groove 13-21, the front end of the a second hook shaped connector 7-1 is provided with an inclined surface that matches with the protrusion 13-3, and the rear end of the inclined surface is a clamping groove, which is matched through the inclined surface of the second hook-shaped connector 7-1 and the inclined surface on the protrusion 13-3 during installation; the second hook-shaped connector 7-1 can be pressed into the second clamping groove 13-21 to complete the installation of the socket 13 and the rope base 7, which is very convenient.

In addition, a positioning rod 7-2 is provided in the middle of the rope base 7 with a positioning block in the middle of the socket 13, which is convenient for positioning during installation.

After adopting such a structure, when opened, most of the first flexible deflection member 6-1 wound on the rope base 7 is pulled out by the pulling force of the first connecting member 9-1, and the rope base 7 rotate to receive the second flexible deflector 6-2 into the spiral groove 12; when closed, the first connector 9-1 pulls the third flexible deflector 6-3, and the third flexible deflector 6-3 pulls the second connector 9-2 to pull out the second flexible deflector 6-2 which is mostly wounded on the rope base 7, and the rope base 7 rotates to receive the first flexible deflector 6-1 into the spiral groove 12 at the same time. The connecting rod 8 fixedly connected to the rope base 7 keeps the rope bases 7 on both sides rotating synchronously, and the sliding rail and the intermediate rail are kept in synchronous movement through the function of the flexible deflector 6 to realize the fixed rail 2, the intermediate rail 3 and the sliding rail 4 on the two sets of sliding rail assemblies 1a and 1b all move synchronously; because only the flexible deflector 6, the rope base 7 and the connecting rod 8 are needed to realize the synchronous movement of the two sets of sliding rails 1a and 1b, the structure is simple, and the installation, production, and replacement are convenient; and because the flexible deflection member 6 is wound and connected to the rope base 7 and then connected to the two sets of slide rail assemblies through the connecting rod 8, the flexible deflection member 6 or the connecting rod 8 can be replaced separately during replacement, It is more convenient, and the connecting rod 8 is used as the component connecting the two sets of slide rail assemblies 1a, 1b, which is less prone to wear and has a longer life.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A three-section synchronous slide rail, comprising: two sets of slide rail assemblies, wherein the two sets of the slide rail assemblies are respectively installed with synchronization components, the slide rail assemblies respectively comprise a fixed rail, a middle rail and a sliding rail, the synchronization components respectively comprise a flexible deflector unit and a roller provided on the middle rail, the flexible deflector unit is respectively connected with the fixed rail and the sliding rail, wherein the middle rail is further connected with a rope base, the rope base is capable of rotating on the middle rail, a first end of the flexible deflector unit is wound around a first end of the rope base and then fixed to the rope base, and a second end of the flexible deflector unit bypasses the roller, then is reversely wound on a second end of the rope base and fixed to the rope base, and a connecting rod is connected between the rope bases of the two sets of the slide rail assemblies;

wherein a first connector is fixedly connected with the sliding rail, a second connector is fixedly connected with the fixed rail, and the first connector and the second connector are respectively configured to connect the flexible deflector unit;

wherein a spiral groove is provided on the rope base, and the flexible deflector unit is wound on the rope base along a rotation path of the spiral groove;

wherein the flexible deflector unit comprises a first flexible deflector, a second flexible deflector, and a third flexible deflector; wherein a first end of the first flexible deflector is fixed and wound on the rope base, and a second end of the first flexible deflector is connected to a first end of the third flexible deflector via the first connector, and a second end of the third flexible deflector is connected to a first end of the second flexible deflector through the second connector after bypassing the roller; a second end of the second flexible deflector is wound and connected on the rope base.

2. The three-section synchronous slide rail, as recited in claim 1, wherein fixed grooves are provided on the openings of both ends of the spiral groove, fixed grooves are respectively provided on a middle portion of the first connector and the second connector, and the fixed grooves of the first connector and the second connector extend on both sides to form slots matching with a size of the flexible deflector unit; a first end of the first flexible deflector is installed in a first fixing groove on the rope base through a fixing block; a second end of the first flexible deflector and a first end of the third flexible deflector are installed in the fixing groove on the first connector through a fixing block; and a second end of the third flexible deflector and a first end of the second flexible deflector are installed in the fixing groove of the second connector through fixing block, and a second end of the second flexible deflector is installed in a second fixing groove of the rope base through the fixing block.

3. The three-section synchronous slide rail, as recited in claim 1, wherein the rope base is sheathed with a socket, the socket wraps the rope base, an opening for the flexible deflector unit is provided on the socket; a first hook-shaped connector is provided on a side where the socket contacts the middle rail; the first hook-shaped connector is clamped with a hole on the middle rail; a connecting protrusion is provided on a side where socket contacts the rope base; wherein protrusions are provided on the connecting protrusion, which are used for clamping with a second hook-shape connector in a groove on a side of the rope base.

4. The three-section synchronous slide rail, as recited in claim 3, wherein a front end of the first hook-shaped connector is provided with a thin front and a thick inclined surface, a rear end of the inclined surface is provided with a first clamping groove, and a through groove is opened in the middle of the first hook-shaped connector; thick and thin inclined surfaces are provided on the protrusion, the front end of the protrusion is provided with a second clamping groove, and the front end of the second hook-shaped connector is provided with an inclined surface for matching the protrusion.

* * * * *